US005160470A

United States Patent [19]

Graville et al.

[11] Patent Number: 5,160,470

[45] Date of Patent: Nov. 3, 1992

[54] METHOD FOR COMPACTING SILICA FUME

[75] Inventors: Steven W. Graville, Eugene, Oreg.; Clifford C. Reese, Midland, Mich.

[73] Assignee: Dow Corning Corporation, Midland, Mich.

[21] Appl. No.: 885,791

[22] Filed: May 20, 1992

[51] Int. Cl.[5] .............................................. B29C 43/00

[52] U.S. Cl. .................................... 264/123; 264/109; 23/293 R

[58] Field of Search ............. 264/109, 123; 23/293 R, 23/313 R, 313 AS; 423/335

[56] References Cited

U.S. PATENT DOCUMENTS

| | | | |
|---|---|---|---|
| 2,729,855 | 1/1956 | Titus et al. | 264/109 |
| 3,114,930 | 12/1963 | Oldham et al. | 241/68 |
| 3,632,247 | 1/1972 | Loffler | 425/135 |
| 3,664,385 | 5/1972 | Carter . | |
| 3,832,434 | 8/1974 | Flood et al. | 264/117 |
| 3,892,832 | 7/1975 | Schey | 264/109 |
| 4,126,423 | 11/1978 | Kongsgaarden | 23/293 R |
| 4,126,424 | 11/1978 | Kongsgaarden | 23/293 R |
| 4,325,686 | 4/1982 | Leon et al. | 425/371 |
| 4,326,852 | 4/1982 | Kratel et al. | 23/293 R |
| 4,436,682 | 3/1984 | Knopp | 264/70 |
| 4,780,108 | 10/1988 | Razzano | 23/293 R |
| 5,049,333 | 9/1991 | Wolfe et al. | 264/109 |

*Primary Examiner*—Mary Lynn Theisen
*Attorney, Agent, or Firm*—William F. Boley

[57] ABSTRACT

The present invention is a simple method for densifying colloidal silica. The method comprises feeding colloidal silica, recovered from a smelting process and having a density within a range of about 50 $kg/m^3$ to 300 $kg/m^3$, by a nearly horizontal feed means to a pair of vertically juxtaposed pressure rolls having surface depressions positioned so that the surface depressions of one roll corresponds to the undepressed surface portions of the other roll. The method does not require deaeration of the colloidal silica prior to densification and can be run as a continuous process. Colloidal silica densified by the present process is especially suitable for use as a reinforcing agent for concrete.

5 Claims, 1 Drawing Sheet

METHOD FOR COMPACTING SILICA FUME

BACKGROUND OF INVENTION

The present invention is a method for compacting silica fume emitted from a smelting process into a form suitable for use as a reinforcing agent in concrete. The method involves the feeding of the silica fume through a horizontal feed means to a pair of vertically juxtaposed pressure rolls having surface depressions positioned so that the surface depressions of one roll correspond to the undepressed surface portions of the other roll.

In the production of materials having a high silicon content such as silicon, ferrosilicon, silicon carbide, and other silicon-containing alloys in smelting furnaces, there is generated a great deal of silicon monoxide which is converted to silicon dioxide. The silicon dioxide is in a very fine form and it is normally referred to as colloidal silica.

Because of the very light nature of colloidal silica, it does not remain in the smelting process but rather is carried up with the off gases from the smelting process into the furnace flue. Because escaping colloidal silica would be an environmental pollutant, it is necessary that the colloidal silica be recovered from the smoke from the smelting furnace. Typical dry methods employed in this regard involve bag house filters and similar means.

The very fine colloidal silica recovered, which has a typical weight by volume of 150 kg/m$^3$ to 200 kg/m$_3$, must then be disposed. The recovered colloidal silica is useful as a reinforcing agent for concrete. However, the use of colloidal silica in this application suffers from the disadvantage that due to the low density it is expensive to ship and store and is difficult to handle.

Accordingly, it is desirable to provide a method for increasing the density of the colloidal silica in order to reduce shipping and storage cost and to facilitate handling. Furthermore, it is desirable to provide a method to densify the colloidal silica such that the densified material is suitable for use as a reinforcer for concrete.

An apparatus for densifying and granulating powered materials is disclosed in Oldham et al., U.S. Pat. No. 3,114,930. Oldham et al. rely on a conical chamber having a rotary roll feed screw and maintained under vacuum to aerate and densify the powdered material prior to feeding of the powdered material to the juxtaposed pressure rolls.

Loffler. U.S. Pat. No. 3,632,247, describes a process where powders are compressed and deaerated between vacuum cylinders which are arranged in groups requiring different vacuum and connected to a common vacuum line. Valve control means in the vacuum line automatically and continuously adjust the vacuum pressure for the group of vacuum cylinders.

Carter, U.S. Pat. No. 3,664,385, compacts finely divided particulate material by utilizing a rotating screw feeder. The particulate material is advanced axially along a sleeve with the interstitial air between the particles in the sleeve at an internal sleeve pressure. Suction pressure relatively lower than the internal sleeve pressure is applied to the exterior of the sleeve to withdraw air from between the particles of the material to effect compaction.

Kongsgaarden, U.S. Pat. No. 4,126,423, discloses a method for compacting silica dust where the dust is charged to a drum having closed ends and is tumbled therein. Kongsgaarden. U.S. Pat. No. 4,126,424, describes a process for increasing the bulk density of silica dust where the silica dust is charged to a hopper and pressurized air is injected into the hopper at a force sufficient to fluidize the silica dust.

Leon et al., U.S. Pat. No. 4,325,686, disclose a powder densifying apparatus comprising a pair of opposed gas-permeable belts arranged to either side of a common axis so as to define a generally convergent densifying zone between their adjacent faces. The gas-permeable belts are driven toward the convergent end of the densifying zone at substantially equal speeds while powder material to be densified is fed into the divergent end of the densifying zone at a rate sufficient to maintain a substantially complete fill.

Kratel et al., U.S. Pat. No. 4,326,852, provide a method for increasing the bulk weight of silicon dioxide by means of sub-atmospheric pressure applied at a filter face, where the silicon dioxide is moved by means of a conveyer screw, whose longitudinal axis is arranged parallel with respect to the filter face and which preferably has a decreasing thread pitch in the feeding direction.

The principle advantage provided by the present method for compacting colloidal silica is its simplicity. The inventors have found that colloidal silica can be compacted in a form suitable for concrete reinforcement by merely feeding the colloidal silica by a horizontal feed means through a pair of vertically juxtaposed pressure rolls having surface depressions positioned so that the surface depressions of one roll correspond to the undepressed surface portions of the other roll. The described method does not require pre-compaction techniques using increased or decreased pressures or filtration as described in the prior art. Also, the present method can be conducted as a continuous process.

SUMMARY OF INVENTION

The present invention is a simple method for densifying colloidal silica. The method comprises feeding colloidal silica, recovered from a smelting process and having a density within a range of about 50 kg/m$^3$ to 300 kg/m$^3$, by a nearly horizontal feed means through a pair of vertically juxtaposed pressure rolls having surface depressions positioned so that the surface depressions of one roll corresponds to the undepressed surface portions of the other roll. The method does not require deaeration of the colloidal silica prior to densification and can be run as a continuous process. Colloidal silica densified by the present process is especially suitable for use as a reinforcing agent for concrete.

DESCRIPTION OF INVENTION

Figure 1:
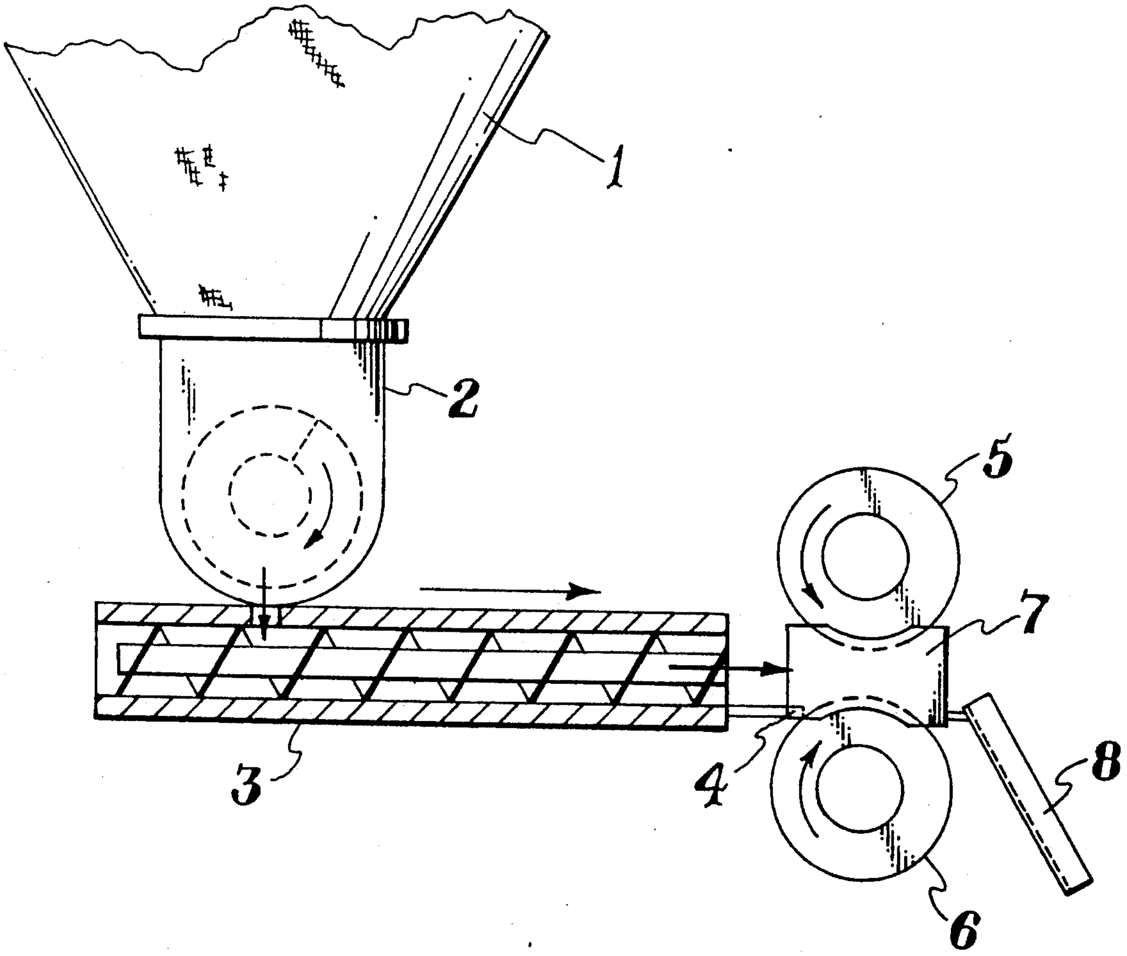
FIG. 1 is a schematic representation of the present method demonstrating a nearly horizontal feed means positioned to provide a feed to a pair of vertically juxtaposed pressure rolls.

The present invention is a method for densifying colloidal silica. The method comprises feeding colloidal silica, recovered from a smelting process and having a density within a range of about 50 kg/m$^3$ to 300 kg/m$^3$, by a nearly horizontal feed means to a pair of vertically juxtaposed pressure rolls having surface depressions positioned so that the surface depressions of one roll correspond to the undepressed surface portions of the other roll.

The colloidal silica which can be densified by the present method is collected from smelting processes which emit colloidal silica during the process. The smelting process can be, for example, for the production of silicon, silicon carbide, or silicon alloys. The colloidal silica can be collected by standard means, for example, filtration. The colloidal silica useful in the present process can have a density within a range of about 50 $kg/m^3$ to 300 $kg/m^3$. Preferred is when the colloidal silica has a density within a range of about 80 $kg/m^3$ to 250 $kg/m^3$. Colloidal silica densified by the present method typically has a density within a range of about 450 $kg/m^3$ to 575 $kg/m^3$.

FIG. 1 schematically represents a configuration of equipment useful for conducting the present process. Colloidal silica is gravity fed from hopper 1 through rotary lock 2 to nearly horizontally orientated feed means 3. Hopper 1 can be of any standard design for the storage and transfer of particulate material. Rotary lock 2 can be of any standard design. Rotary lock 2 is contacted with one end of nearly horizontally orientated feed means 3 and facilitates the transfer of colloidal silica from hopper 1 to feed means 3. By "nearly horizontally orientated" it is meant that the longitudinal axis of feed means 3 is located within plus or minus ten degrees of the horizontal plane. Feed means 3 can be any standard means for transporting particulate material. Preferred is when feed means 3 is of a standard auger design appropriate for transporting particulate material. The other end of feed means 3 opens onto guide plate 4 which directs the colloidal silica into the nip of vertically juxtaposed pressure roll 5 and pressure roll 6. A guide plate 7 is located on each side of the pressure rolls as illustrated and serves to keep the silicon dust within the nip formed by the juxtaposition of pressure roll 5 and pressure roll 6. Chute 7 is position at the exit of the nip formed by pressure roll 5 and pressure roll 6 and serves to transport the densified colloidal silica to a suitable storage container.

The optimal rate of feed of colloidal silica from feed means 3 to the nip formed by the juxtaposition of pressure roll 5 and pressure roll 6 will depend upon such factors as the size of the pressure rolls and their speed. The feed rate should be maintained at a level to maintain a slight pressure of colloidal silica against the pressure rolls without excessive buildup of colloidal silica. By way of example, using pressure rolls having a diameter of about 45 cm and about 15 cm in length and a rotation speed of about 50 to 60 rpm, a useable feed rate is within a range of about 750 kg/h to 850 kg/h.

Sufficient pressure should be maintained on pressure roll 5 and pressure roll 6 to minimize the gap between them. In general, a pressure within a range of about 500 psi to 500 psi is considered useful. Higher pressures may be used but to no perceived advantage. Lower pressures may be used, but may result in the production of less dense material. Preferred is a pressure on the pressure rolls within a range of about 700 psi to 1000 psi.

Vertically juxtaposed pressure roll 5 and pressure roll 6 have surface depressions positioned so that the surface depressions of one pressure roll corresponds to the undepressed surface portions of the other pressure roll. The design of the depressions are not critical to the present invention and can be of standard designs for briquetting particulate materials. A preferred design is where the pressure rolls have about a 1.0 cm to 3.0 cm peak to peak longitudinal corrugated pattern, with the longitudinal corrugations being about 0.3 cm to 1.0 cm in depth. A more preferred design is where the pressure rolls have about a 1.9 cm peak to peak corrugated pattern, with the corrugations being about 0.6 cm in depth.

The following example is offer as illustrative of the present method. This example is not intended to limited the claims provided herein.

Example. Colloidal silica collected in a bag filter from the off-gas of a silicon smelting furnace was densified by use of an apparatus configured similar to that illustrated in FIG. 1. A Model B-400 Briquettor manufactured by K. R. Komarek. Inc., Elk Grove Village. Ill. was employed. Feed to the briquettor was by a horizontally orientated feed auger. The pressure rolls of the briquettor were 45 cm in diameter, 15 cm in width, and had a corrugated surface. The corrugated surface consisted of 1.9 cm peak to peak longitudinal corrugations that were about 0.6 cm in depth. The rotational speed of the pressure rolls was about 50 rpm to 60 rpm. A pressure of about 900 psi was maintained on the pressure rolls to assure their close juxtaposition. Feed rate of the colloidal silica to the pressure rolls was about 825 kg/h. The starting density of the colloidal silica was about 160 $kg/m^3$. The compacted silica had a density of about 480 $kg/m^3$.

We claim:

1. A method for densifying colloidal silica, the method comprising, feeding colloidal silica recovered from a smelting process, the colloidal silica having a density within a range of about 50 $kg/m^3$ to 300 $kg/m^3$, by a nearly horizontal feed means through a pair of vertically juxtaposed pressure rolls having surface depressions positioned so that the surface depressions of one roll corresponds to the undepressed surface portions of the other roll.

2. A method according to claim 1, where the colloidal silica has a density within a range of about 80 $kg/m^3$ to 250 $kg/m^3$.

3. A method according to claim 1, where each pressure roll has a diameter of about 45 cm and is about 15 cm in length, the surface of each pressure roll has about a 1.9 cm peak to peak longitudinal corrugated pattern with the corrugations being about 0.6 cm in depth, each pressure roll has a rotational speed within a range of about 50 rpm to 60 rpm, and the feed rate of the colloidal silica is within a range of about 750 kg/h to 850 kg/h.

4. A method according to claim 1, where each pressure roll has a diameter of about 45 cm and is about 15 cm in length, the surface of each pressure roll has about a 1.0 cm to 3.0 cm peak to peak longitudinal corrugated pattern with the corrugations being about 0.3 cm to 1.0 cm in depth, each pressure roll has a rotational speed within a range of about 50 rpm to 60 rpm. and the feed rate of the colloidal silica is within a range of about 750 kg/h to 850 kg/h.

5. A method according to claim 1, where the colloidal silica is not deaerated under reduced pressure prior to feeding through the vertically juxtaposed pressure rolls.

* * * * *